United States Patent
Borkton

[15] 3,685,153
[45] Aug. 22, 1972

[54] YOGURT MACHINE
[72] Inventor: Edgar B. Borkton, 415 Woodlawn Ave., Chula Vista, Calif. 92010
[22] Filed: Jan. 28, 1971
[21] Appl. No.: 110,399

[52] U.S. Cl. .................................... 31/2, 99/59
[51] Int. Cl. ....A01j 11/00, A23c 09/12, A23c 23/00
[58] Field of Search ........ 31/2; 99/59, 328, 333, 335, 99/339, 352

[56] References Cited

UNITED STATES PATENTS

| | | | |
|---|---|---|---|
| 3,505,735 | 4/1970 | Breuning | ........................ 31/2 |
| 2,052,253 | 8/1936 | Savary | ........................ 31/2 X |

*Primary Examiner*—Samuel Koren
*Assistant Examiner*—James H. Czerwonky
*Attorney*—Richard K. MacNeill

[57] ABSTRACT

A yogurt machine for automatically manufacturing yogurt in which milk is heated from boiling water in a double boiler. The water is automatically turned off through a thermally-activated switch or a time switch and a thermostatically-controlled switch set at approximately 110° F is activated to the heater which allows the milk to cool to 110° F. At this time, the thermostat switch applies heat to the water holding it at 110° F and a yogurt culture is automatically dumped onto the top surface of the milk either by a timer or through the action of the 110° F thermostat switch.

1 Claim, 4 Drawing Figures

PATENTED AUG 22 1972 3,685,153
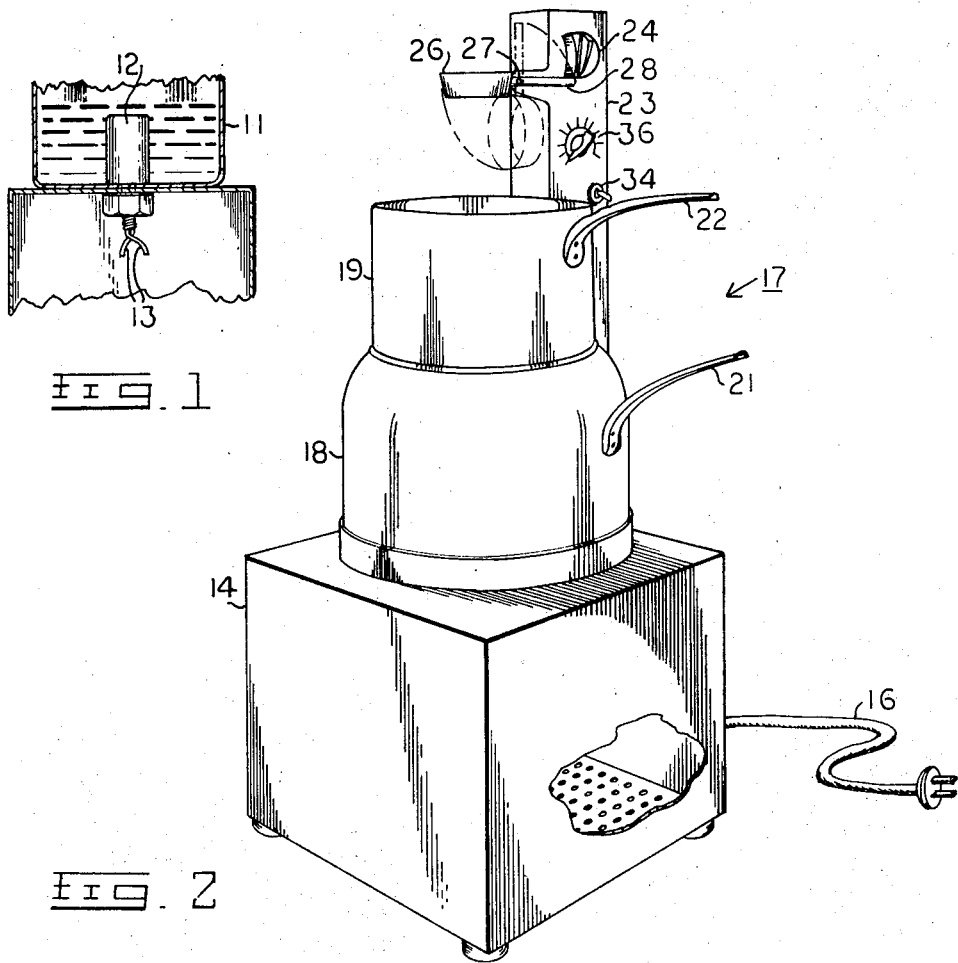
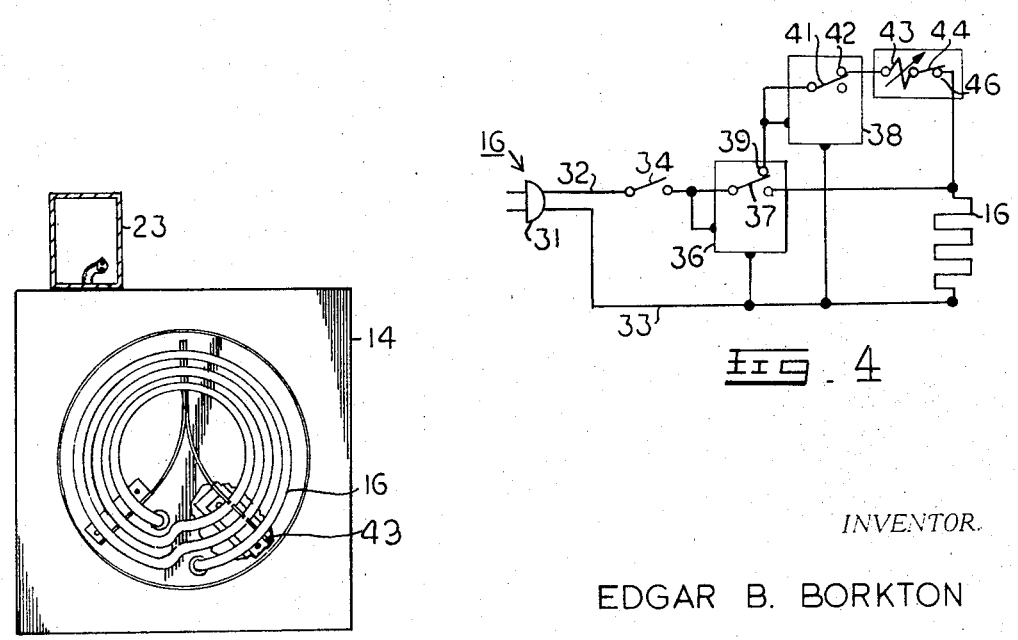
INVENTOR.
EDGAR B. BORKTON

YOGURT MACHINE

BRIEF DESCRIPTION OF THE INVENTION

The present invention relates to a yogurt machine and more particularly to a yogurt machine which automatically performs all the necessary steps in the manufacturing of yogurt.

According to the invention, a yogurt machine is provided in which a double boiler containing water in the lower section is heated to a boiling temperature which, in turn, heats milk contained in an upper section to a temperature just below the boiling temperature of milk. Subsequent to the water reaching a boiling temperature, the heating element is automatically turned off whether it be an electrical heater or a gas heater, and the water is allowed to cool to approximately 110° F. When this temperature is reached, a thermostatically-controlled element holds the water temperature at 110° F and simultaneously, whether by a separate timer or through the thermostatically-controlled element, yogurt culture is dumped onto the surface of the milk. The surface application insures even disbursement in the milk and the combination is allowed to incubate for several hours after which, it is further cooled. The entire operation is completely automatic and requires only that the operator add the water, milk and yogurt culture in their respective containers and turn it on.

An object of the present invention is the provision of an improved automatic yogurt machine.

Another object of the invention is the provision of an improved yogurt machine which yields a completely consistent product.

Yet another object of the invention is the provision of an improved yogurt machine which is inexpensive to manufacture and extremely convenient in use.

Other objects and many of the attendant advantages of this invention will be readily appreciated as the same becomes better understood by reference to the following detailed description when considered in connection with the accompanying drawings in which like reference numbers designate like parts throughout the FIGS. thereof and wherein:

FIG. 1 is a side elevation in section illustrating a heating element utilized in the present invention;

FIG. 2 is a perspective view of the preferred embodiment of the overall invention;

FIG. 3 is a top view of the preferred heating element of the present invention; and FIG. 4 is a schematic representation of the preferred embodiment of the electrical system of the present invention.

DETAILED DESCRIPTION OF THE DRAWINGS

Referring to FIG. 1, the bottom section of a double boiler is shown at 11 having a heating element 12 with suitable electrical leads 13.

Referring to FIG. 2, a heater housing is shown at 14 having a suitable electrical cord 16. A double boiler 17 has a bottom section 18 and a top section 19 with handles 21 and 22, respectively. Standard 23 extends from heater housing 14 and contains a mechanical timing cam 24 and a container 26 pivotally attached at 27 to standard 23. Container 26 has an extension 28 in contact with timing cam 24.

Referring to FIG. 3, heater housing 14 is shown having a heating element 16 with a standard 23 attached thereto.

Referring to FIG. 4, an electric cord 16 has a plug 31 with incoming leads 32 and 33. Incoming lead 32 goes through on-off switch 34 to one side of a timer 36 and through timer switch 37 to heating element 16. Incoming lead 33 is coupled to one side of timer 36 and one side of timer 38 to another side of heating element 16. Contact 39 of switch 37 is coupled to another side of timer 38 and to switch arm 41. Switch arm 41 has a switch contact 42 coupled to one side of thermostat 43. The other side of thermostat 43 is coupled through thermostat switch arm 44 to contact 46 and one side of heating element 16.

OPERATION

Referring to FIGS. 2 and 3, the operational sequence will be described. Quiescently, section 18 of double boiler 17 contains water and section 19 contains milk. Container 26 is filled with a yogurt culture and is in the position shown being held there by cam timer 24. The unit is then started by throwing on-off switch 34 which applies power through switch arm 37 to heating element 16. When the water in section 18 reaches its boiling temperature, the milk in section 19 will have reached a temperature close to but lower than its boiling point. At this time, or shortly thereafter, timer 36 operates switch arm 37 to make contact with contact 39. This removes power from heating element 16 and through contact 39 applies power to timer 38. After present time of several hours has elapsed and solution has cooled to approximately 110° F, cam 24 of timer 38 has rotated counterclockwise and container 26 will swing to the position shown in dotted lines dumping the yogurt culture into section 19 of double boiler 17. At this time, timer 38 operates switch arm 41 to make contact with contact 42. This applies power to heating element 16 through the thermostat 43 and switch arm 44 when it is in the cooled position, and maintains the solution at approximately 110° F.

Referring to FIG. 1, a simplified version is shown whereby an internal heater 12 is placed in a water container 11 (which would actually take the place of section 18 of double boiler 17) and would heat the water to a boiling temperature at which time, a thermostatic control (not shown) could open the current to the heater and lock in a position applying current through a thermostat such as 43 which, when applying heat back to heater 12, could actuate a solenoid releasing container 26.

As can be seen, many switching variations can be utilized to effect the automatic operation of heating the milk to a point just below its boiling temperature, allowing it to cool to approximately 110° F, dumping in the yogurt culture and incubating the solution.

It should be understood of course that the foregoing disclosure relates to only a preferred embodiment of the invention and that it is intended to cover all changes and modifications of the example of the invention herein chosen for the purposes of the disclosure which do not constitute departures from the spirit and scope of the invention.

The Invention claimed is:

1. A yogurt machine for automatically manufacturing yogurt comprising:
    a double boiler having top and bottom compartments, said top compartment containing milk and said bottom compartment containing water;

heating means disposed beneath said bottom compartment;

first control means coupled to said heating means, said first control means operable for removing said heating means after water in said bottom compartment reaches a boiling temperature;

second control means coupled to said heating means operable for maintaining said water in said bottom compartment at approximately 110° F after cooling from a boiling temperature;

a container having yogurt culture therein disposed above said top compartment; and means coupled to said container operable for dumping said yogurt culture into said top compartment after said water is cooled to approximately 110° F.

* * * * *